(12) United States Patent
Bracamonte et al.

(10) Patent No.: US 9,933,031 B2
(45) Date of Patent: Apr. 3, 2018

(54) SYSTEMS AND METHODS FOR FORMING A LAYER ONTO A SURFACE OF A SOLID SUBSTRATE AND PRODUCTS FORMED THEREBY

(71) Applicant: ATS MER, LLC, Tucson, AZ (US)

(72) Inventors: Lori Bracamonte, Tucson, AZ (US); James Withers, Tucson, AZ (US); Jowie Abcede, Tucson, AZ (US)

(73) Assignee: ATS MER, LLC, Tucson, AZ (US)

( * ) Notice: Subject to any disclaimer, the term of this patent is extended or adjusted under 35 U.S.C. 154(b) by 0 days.

(21) Appl. No.: 15/357,730

(22) Filed: Nov. 21, 2016

(65) Prior Publication Data

US 2017/0175834 A1 Jun. 22, 2017

Related U.S. Application Data

(60) Provisional application No. 62/265,765, filed on Dec. 10, 2015, provisional application No. 62/258,448, filed on Nov. 21, 2015.

(51) Int. Cl.
*F16D 65/12* (2006.01)
*B22D 19/08* (2006.01)
*B22D 23/06* (2006.01)
*B22D 27/15* (2006.01)

(52) U.S. Cl.
CPC .......... *F16D 65/127* (2013.01); *B22D 19/08* (2013.01); *B22D 23/06* (2013.01); *B22D 27/15* (2013.01); *F16D 65/125* (2013.01); *F16D 2200/003* (2013.01); *F16D 2200/0086* (2013.01)

(58) Field of Classification Search
CPC .... B22F 2998/00; C23C 26/00; F16D 65/127; B22D 19/08

USPC ........................................................ 188/18 A
See application file for complete search history.

(56) References Cited

U.S. PATENT DOCUMENTS

| | | | |
|---|---|---|---|
| 6,316,125 B1 | 11/2001 | Gaman et al. | 428/654 |
| 8,203,095 B2 | 6/2012 | Storm et al. | 219/121.47 |
| 8,893,954 B2 | 11/2014 | Schultz et al. | 228/1 |
| 2005/0183909 A1* | 8/2005 | Rau, III | F16D 65/0006 188/218 XL |
| 2005/0268517 A1 | 12/2005 | Withers et al. | 42/76.02 |
| 2008/0000881 A1 | 1/2008 | Storm et al. | 219/121.47 |

(Continued)

FOREIGN PATENT DOCUMENTS

WO WO 2007033378 3/2007 ............. B23B 15/00

OTHER PUBLICATIONS

Invitation to Pay Additional Fees and, Where Applicable, Protest Fee from corresponding PCT International Patent Application. Serial No, PCT/US16/63134, dated Jan. 23, 2017, 3 pages.

(Continued)

*Primary Examiner* — Weiping Zhu
(74) *Attorney, Agent, or Firm* — Hayes Soloway PC

(57) ABSTRACT

A method for forming a vehicular brake rotor involving loading a shaped metal substrate with a mixture of metal alloying components and ceramic particles in a dieheating the contents of the die while applying pressure to melt at least one of the metal components of the alloying mixture whereby to densify the contents of the die and form a ceramic particle-containing metal matrix composite coating on the metallic substrate; and cooling the resulting coated product.

12 Claims, 5 Drawing Sheets

(56) References Cited

U.S. PATENT DOCUMENTS

2010/0285207 A1    11/2010    Creehan et al. ................ 427/11

OTHER PUBLICATIONS

International Search Report and Written Opinion issued in application No. PCT/US16/63134, dated Apr. 4, 2017 (13 pgs).
Official Action dated Jan. 19, 2018 issued in related U.S. Appl. No. 15/822,029, 12 pgs.
Official Action dated Jan. 17, 2018 issued in related U.S. Appl. No. 15/822,028, 12 pgs.
Official Action dated Jan. 19, 2018 issued in related U.S. Appl. No. 15/822,023, 11 pgs.
Official Action dated Jan. 19, 2018 issued in related U.S. Appl. No. 15/822,026, 14 pgs.

* cited by examiner

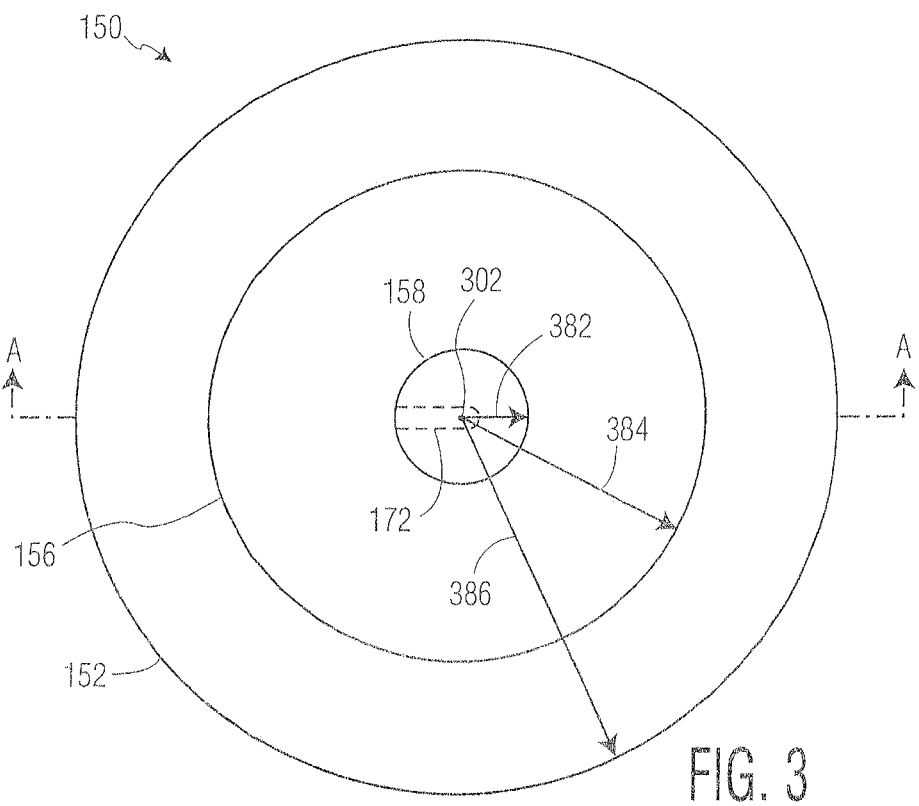
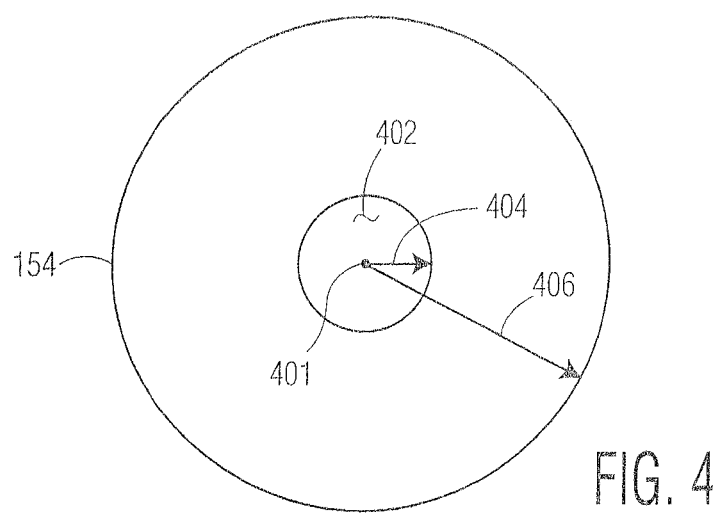

SYSTEMS AND METHODS FOR FORMING A LAYER ONTO A SURFACE OF A SOLID SUBSTRATE AND PRODUCTS FORMED THEREBY

CROSS REFERENCE TO RELATED APPLICATIONS

This application claims priority from U.S. Provisional Application Ser. No. 62/258,448, filed Nov. 21, 2015, and from US Provisional Application Ser. No. 62/265,765, filed Dec. 10, 2015, the contents of which are incorporated herein by reference.

FIELD OF THE INVENTION

The present invention relates to the formation of substantially pore free wear resistant metal ceramic particulate composites on metal substrates, systems for forming such composite layers, and products made. The invention has particular utility in connection with vehicular brake rotors and will be described in connection with such utility, although other utilities are contemplated.

BACKGROUND OF THE INVENTION

Land vehicles including cars, trucks, trains, and mass transit systems use disc brakes to slow and/or stop the vehicle. Disc brake systems generally include a rotor and caliper. The rotor is mounted to turn with the wheel of the vehicle. The caliper includes brake pads that are forced into frictional contact with the rotor to slow and or stop rotation of the wheel. Conventional cast iron brake rotors are relatively heavy. These rotors wear during braking, generating dust. Alternatives to conventional cast iron brake rotors can reduce weight as well as contribute to better fuel economy, reduced both air and water pollution, and enhanced vehicle acceleration. Reduced weight materials to cast iron include aluminum and titanium; however, their surface tribology in a friction application, in contrast to cast iron, lacks the necessary performance to function as a brake rotor. It has been known to add ceramic particulate to a metal matrix to increase friction for improved stopping power and to enhance wear resistance, which also has the advantage of producing little to no dust in a friction application.

Many conventional processes have drawbacks when applied to forming brake rotors with desirable features. For example, some rotors formed of aluminum with a ceramic coating applied by a conventional plasma spray technique have unsatisfactory residual porosity as well as insufficient adhesion of the coating to the rotor substrate for vehicular rotor applications. Brake rotors mostly free of porosity are enabling for reliability and good heat transfer.

Conventional stir casting used to produce composites and particularly aluminum-ceramic particle composites inherently results in unacceptable porosity for most vehicular rotor applications. In addition, ceramic particle loading of at least 30 to 50% by volume is desirable for high wear resistance and braking performance of vehicles with relatively high momentum. Conventional stir casting is not known to produce pore free composites at this necessarily high particle loading. In conventional stir casting, ceramic particles are incorporated throughout a molten aluminum alloy. As the insoluble particulate is stirred into the liquid aluminum, the viscosity of the mixture increases with the volume of particulate added. The increase in viscosity is also related to the size of the particulate. Generally, the smaller the particulate, the greater the increase in viscosity. However, fine particle sizes are used, preferably below approximately 50 µm for good braking performance. A conventional stir process to incorporate fine ceramic particles into the aluminum matrix for brake rotor applications is limited to approximately 25% by volume, depending on the actual particle size, because slitting and casting of higher volume loading and viscosity mixtures become impractical.

SUMMARY OF THE INVENTION

It is therefore an object of the present invention to provide a method and apparatus for forming substantially porosity free metal/ceramic composite bonded on support substrates that overcomes the aforesaid and other problems with the prior art.

According to various aspects of the present invention, a composite layer formed on a surface of a substrate (e.g., a vehicular brake rotor), using the systems and methods discussed herein, is substantially free of porosity and includes ceramic particles of desirable size and composite density. A relatively high density of ceramic particles within the composite layer has a capability to retard heat flow into the core substrate. The layer may encompass the entire substrate surface or be formed in one or more selected regions (e.g., one or more circular bands) of an external surface of the substrate. The composite layer may also provide reinforcement to the substrate, so that the combination of the layer and substrate provides an improved combination of mechanical and thermal properties (e.g., friction coefficient, wear rate, thermal conductivity, thermal capacity, specific heat, specific gravity, density, compressive strength, ductility, stiffness) compared to the substrate without the layer.

In an application of the inventions discussed herein related to vehicular brake rotors, the layer depending on particle volume loading has higher friction and inherently has higher heat capacity than cast iron. The higher heat capacity provides a greater heat storage capacity than iron, a ceramic particle loading higher than approximately 30 volume percent provides improved braking performance, and low wear characteristics results in little or no dust generation, and thus less air pollution than cast iron.

The composite friction layer may be graded as to density or volume of ceramic particles as a function of distance from the outer surface of the layer toward the substrate. More than one layer may be formed. For example, when the ceramic particle volume is varied from the outer surface to the substrate core, the temperature of the substrate may be less than the temperature of an exterior surface. A thin coating on the external surface by conventional means that includes a relatively low thermal conductivity ceramic (e.g., oxides) may provide excellent thermal insulation of heat flow to the substrate.

Substrates of aluminum, aluminum alloy, titanium, and/or titanium alloy are much lighter than cast iron and are preferred because of their light weight and high heat capacity for vehicular brake rotor applications. Titanium, similar to aluminum, does not provide a tribological surface suitable for vehicular brake rotor applications. A layer of ceramic particles in a metal matrix of one or more metals (e.g., metals of the substrate, or metals having lower melting points than the substrate melting temperature, and metals serving as reactants in an intended exothermic reaction) may provide a wear resistant composite braking surface capable of withstanding vehicular braking temperature extremes.

In the description below, reference is made to vehicular brake rotors as an example of a metal substrate coated with a metal matrix composite layer. The metal substrate is also called a core. In operation, an external surface of the layer provides a braking surface. When such a brake rotor is mounted on a wheeled vehicle, in a conventional fashion, as discussed above, friction between the braking surface and one or more brake pads slows and/or stops the vehicle.

A system for forming a layer onto a surface of a solid metal substrate may be assembled from conventional manual and/or automated processing and process controlling equipment and facilities configured according to the disclosures herein. Automation may be accomplished by installing in the equipment, or linking the equipment for access to, firmware and/or software prepared using conventional programming technologies. In one implementation, a system includes an integration of a chamber, a heater, a press, and a vacuum pump of conventional design. A system may be of the type known as a vacuum hot press. Commercial vacuum hot presses of the type supplied by Thermal Technology LLC of Santa Rosa, Calif. and The Furnace Source LLC of Terryville, Conn. may be used, or custom made systems can meet the objectives of producing metal matrix composite brake rotors.

A chamber includes any enclosure insulated to economically maintain a relatively high temperature within and relatively low atmospheric pressure within, while located in ambient conditions without. The furnace operation may also be performed under positive pressure or with a gas flow, as long as an inert gas such as argon or a gas that is substantially unreactive with the brake materials such as nitrogen is used. Generally, a chamber includes a closable opening through which opening a die may be placed in the chamber to be subject to the higher temperature and applied pressure for a desirable period and later removed from the chamber. Additional passages through the enclosure are generally useful for supporting the heating, pressing, and evacuating functions; as well as instrumentation and controls. A chamber may include a structure to accommodate a press. Conversely, a chamber may be moveable and lowered or alternatively raised over a base with ceramic composite layers to be processed into a brake rotor.

A heater includes any apparatus (e.g., electrical, chemical, magnetic) that provides energy to heat the contents of the die. Heating may be conducted into the die (e.g., pressing a hot object against the die, electrical conduction through the resistance of the die and/or its contents, magnetic induction and heating of the type called spark plasma sintering also referred to as field assist sintering technology (FAST) or current activated pressure assisted densification) and/or radiated toward the die (e.g., microwave heating, electron beam heating, laser light heating, radiant heat source within the chamber, and conduction or convection via a gas that surrounds the die prior to evacuation of the chamber). The heater may include a source of energy used for heating. The heater may have access to a source of energy used for heating or energy conversion. The heater may convert energy from one form to another (e.g., electrical power to RF for magnetic induction, pulsing of power, etc.)

A press includes any equipment that applies a mechanical force onto a die within the chamber. A press may include one or more rams (e.g., moving piston, fixed backstop) that come in contact with the die to apply the force. The press may include heating, cooling, and/or insulation to reduce thermal variation between the press and the die.

A vacuum pump includes any mechanical equipment that removes gas from a chamber. A vacuum pump may also replace the gas in the chamber with another gas. A vacuum pump may govern a pressure of gas surrounding the die.

Integrating control of the temperature, mechanical pressure, and extent of surrounding gas within the chamber may be accomplished by one or more programmed controllers. Programming may include sequences for treating the contents of the die and sequences for maintaining safe operating conditions for persons, equipment, and the contents of the die. Sequences, in any conventional programming language, may include instructions (e.g., commands, parameters, arguments, statements) that define set points, rates of change, durations at set points, durations for accomplishing changes, limit conditions for exceptional actions when the limit is crossed (e.g., return chamber to ambient conditions, return chamber to known safe conditions, sound alarm for operator to make adjustment, end sequential control), and/or program sequence controls (e.g., branching, looping, subroutines, error handling). Programming may be centralized or distributed. When program control is distributed among specialized controllers, signals conveying status and controls (e.g., feedback, commands, requests for information, requests for resources, commitments) may be sent and received using conventional technologies to accomplish the effect of centralized program control.

DESCRIPTION OF THE DRAWINGS

Further features and advantages of the present invention will be seen from the following detailed description, wherein:

FIG. 1 includes a cross sectional view of a die and its contents, according to various aspects of the present invention

FIG. 3 is top view of an empty die for use in the system of FIG. 1 and/or with the method of FIG. 2; and FIG. 4 is a top view of a press fit base for use with the die of FIG. 3; a press fit top having similar construction.

DETAILED DESCRIPTION OF THE INVENTION

Figure 1:
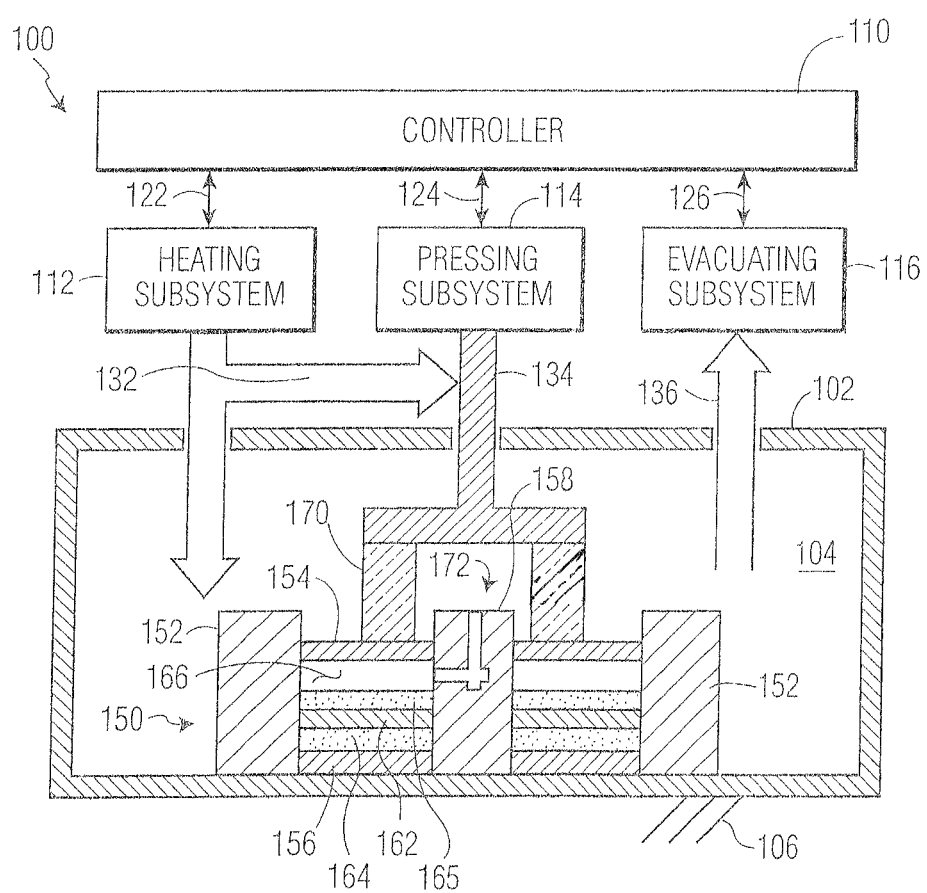
FIG. 1 is a functional block diagram of a system that can be used to produce a dense, essentially porosity free, metal ceramic particulate composite in the architecture of a composite coating on a core metal or as a component that encompasses the entire cross-section of the composite according to one aspect of the present invention.

Referring to the drawings, FIG. 1 shows a system that can be used to produce a dense essentially porosity free metal ceramic particulate composite coating on a metal core in accordance with the present invention. As used herein "porosity free" means that the coating comprises generally not more than about 0.05-2% by volume pores, more particularly about 0.5-1% by volume pores, even more particularly about 0.1-0.25% volume pores.

System 100 of FIG. 1 includes chamber 102, controller 110, heating subsystem 112, pressing subsystem 114, and evacuating subsystem 116. These components of system 100 may be arranged in any convenient orientation to each other and to gravity. As shown, die 150 is located in chamber 102 for processing contents of die 150. Die 150 defines interior 166. Die 150 includes peripheral component 152, press fit base 156, and press fit top 154. Contents of die 150 are placed in die interior 166 and include solid substrate 162 and powder 164 and 165. Placement of the contents into interior 166 is referred to herein as loading die 150. Loading may be accomplished with any conventional technologies manually and/or automatically.

Chamber 102 represents a chamber as discussed above. Chamber 102 provides a thermally insulated interior 104. Chamber 102 isolates the interior 104 from ambient atmosphere. Chamber 102 has a door and a doorway (not shown) through which a loaded die may be placed into the chamber for processing with the door closed. Placement may be by manual and/or automatic means of conventional design (e.g., conveyer, hoist, elevator, turntable, web). When processing is completed, the die may be removed and unloaded to release a product comprising a substrate with a composite layer as discussed above.

Controller 110 represents a programmable controller as discussed above. Portions of controller 110 may be integral to one or more of heating subsystem 112, pressing subsystem 114, and/or evacuating subsystem 116 (e.g., efficient packaging of instrumentation and/or circuitry for performing instructions, for reporting status, for feedback control, for monitoring limit conditions, for alarms, for safety of personnel and equipment, for cooperation with materials handling equipment). Controller 110 includes conventional memory (not shown) and a conventional sequential machine that reads the memory to perform a sequence as discussed above. In an implementation, controller includes a personal computer, Microsoft Windows operating system, and process control software. The personal computer includes a user interface for receiving program instructions to store one or more sequences in the memory; and further includes displays for monitoring progress of the process applied to contents of die 150, observing conditions as described by instrumentation that may be located within heating subsystem 112, pressing subsystem 114, evacuating subsystem 116, chamber 102, and/or die 150. Controller 110 communicates with heating subsystem 112 via signals 122 for status and control using conventional technologies. Controller 110 communicates with pressing subsystem 114 via signals 124 for status and control using conventional technologies. Controller 110 communicates with evacuating subsystem 116 via signals 126 for status and control using conventional technologies.

Heating subsystem 112 includes a heater as discussed above. Heating subsystem 112 responds to controller 110 to provide heat 132 to the contents of die 150 and/or ram 134. Heat from subsystem 112 melts powder 164 and 165 as discussed below. Heating subsystem 112 may further include conventional cooling technologies controlled by controller 110 to cool the contents of die 150 at any suitable time in the sequence.

Pressing subsystem 114 includes a press as discussed above. Pressing subsystem 114 responds to controller 110 to apply a mechanical force to the contents of die 150 via ram 134 and press fit top 154. As shown, pressure from ram 134 is passed through standoff 170 to avoid mechanical interference from hub 158. The force from pressing subsystem 114 densifies the contents of die 150 as discussed below. The mechanical force applied by pressing subsystem 114 is matched by a reaction force. The reaction force may be provided by an opposing ram (not shown). For simplicity, FIG. 1 indicates the reaction force provided by earth ground 106.

Standoff 170, cover 154, and press fit base 156 are designed to evenly distribute the mechanical force of the ram onto the contents of die 150. In an implementation according to various aspects of the present invention, a uniform thickness of the layer is achieved by assuring that the contents of die 150 are maintained throughout the process relatively close to level.

Evacuating subsystem 116 includes a vacuum pump as discussed above. Evacuation subsystem 116 is in fluid communication by coupling 136 to die interior 166 via vent 172 through hub 158, through standoff 170, and chamber interior 104. Evacuation subsystem 116 responds to controller 110 to control the kinds of gases (if any) and gas pressure in die interior 150. Evacuation subsystem 116 may similarly control chamber interior 104, for example, to indirectly control die interior 166 via vent 172. Evacuation subsystem 116 may introduce and/or pressurize one or more gases in die interior 166 and/or chamber interior 104.

A die includes any structure that contains contents subject to temperature and pressure. At least some of the contents may be in liquid phase. For example, die 150 contains (e.g., encloses) substrate 162 and powder 164 and 165 so that any liquid and/or gaseous phase of these materials that may exist during processing will not leak from die 150. For example, when powder 164 and 165 includes aluminum alloy, aluminum alloy in liquid phase (e.g., resulting from an elevated temperature caused by heating subsystem 112) is contained (e.g., enclosed) by die 150 so as not to leak into chamber interior 104. Die 150 may be formed of several components with dimensions suitable for sealing at interfaces between its components.

Sealing prevents the low viscosity liquid metal phase of the contents of die 150 from leaking out of die 150. Seals described herein inhibit leaking of metals at the temperatures and pressures discussed below. According to various aspects of the present invention, the amount of liquid phase contents of die 150 is relatively small compared to liquefying the entire content of die 150.

Die 150 may be formed of graphite, ceramic, and/or metal (e.g., steel, titanium) with a coating (e.g., carbon, graphite, boron nitride).

In one implementation, according to various aspects of the present invention, die 150 is formed of press fitted graphite components, sized to be forced together in a friction fit of a graphite surface of a first component against a graphite surface of a second component.

Components may be friction fit into such materials to form suitable seals between components that prevent any liquid metal under pressure from leaking through such press fitted components.

Member 154 completes the enclosure of die 150 with respect to contents in interior 166. Member 154 conducts mechanical pressure from ram 134 via standoff 170 to contents of die 150. Member 154 also slides within die interior 166 as urged by ram 134. In a first position, as shown, member 154 does not obstruct vent 172. In this position of member 154, vent 172 provides fluid communication between die interior 166 and chamber interior 104. Evacuation of chamber interior 104 consequently evacuates die interior 166 via vent 172. Introduction of a gas into chamber interior 104 also introduces the gas into die interior 166 via vent 172 by filling, mixing, and diffusion.

In one implementation, ram 134 applies a force only in one direction. Ram 134 may be used for three functions. First, ram 134 may be used to introduce member 154 into die 150 to close die 150, applying a force to overcome the friction fit of member 154 and peripheral component 152.

Member 154 is then in a first position. Second, ram 134 may be used to move member 154 away from the first position, in the same direction (further into die 150) to obstruct vent 172 to prevent molten metal from escaping through the vent as pressure is applied. Member 154 is then in a second position. Third, ram 134 may be used to provide a force in the same direction for densification of the contents of die 150.

When ram 134 urges member 154 away from the first position (as shown) and further into die 150, member 154, in a second position, completely obstructs vent 172, providing a gas and liquid seal so that contents of die 150 do not leak into chamber interior 104. In one implementation, according to various aspects of the present invention, member 154, a component of die 150, is formed of graphite. Dimensions of member 154 provide a friction fit inside peripheral component 152 as discussed above.

A substrate or core provides structural rigidity to the intended product. The substrate has a melting temperature that is higher than a melting temperature of at least one of the components forming the composite surface layer so that by applying an elevated temperature that is less than the substrate melting temperature, to the contents of the die, the surface layer material will form a melt while the bulk of the substrate will remain solid, i.e., not melt. There will be melting on the substrate surface in contact with the composite layer that results in excellent bonding. A substrate may be formed of structural metal (e.g., aluminum, cobalt, copper, iron, nickel, titanium, vanadium, zinc) in commercially pure form or in some cases, an alloy. Alloys may include any structural metal(s) and/or alloying material(s) (e.g., chromium, magnesium, manganese, niobium, silicon). The substrate can be commercial plate material precut to a brake rotor which exhibits inherently low porosity or substrate 162 may be a cast or rolled disc of commercially pure aluminum or aluminum alloy formed with low porosity.

A surface layer material which typically is in the form of a powder may include at least one reactant for an exothermic reaction and may further include material to perform a function and/or enhance performance of a function of the product. The function may rely on structural properties. The powder and/or surface layer may be referred to as a reinforcement. The product of substrate and surface layer may be referred to as a core with surface reinforcement. A powder, which may also take the form or a metal ingot may include particles of one or more materials, each material being a component material of the powder. A powder when heated may participate in an exothermic reaction. Preferably, the exothermic reaction does not produce products in a gas phase. For example, powder 164 and 165 are identical in composition. Powder 164 provides a surface that is integral with substrate 162 as a result of the methods discussed herein. Powder 164 and 165 includes a ceramic particulate (e.g., silicon carbide) to improve the friction and wear properties of a vehicular brake rotor formed with substrate 162 as a core. Powder 164 or 165 may include two reactants. The first reactant may be a structural metal and/or an alloying material. The second reactant may be boron, silicon, cobalt, iron, nickel, magnesium, palladium, titanium, or a combination thereof. The exothermic reaction will not begin until the powder is heated to an elevated temperature, determined by the intended reaction and the reactants using conventional analysis, simulation, or test.

For vehicular brake rotors, silicon carbide is a preferred ceramic particle included in the metal powder. Other ceramic particles that may be used, in place of silicon carbide or in addition to silicon carbide, in the powder include metal carbides, nitrides, silicides, oxides, and intermetallic compositions. The metal component of these ceramic particles include aluminum, titanium, boron iron, nickel, cobalt, copper, and zinc solely or in any combination. In an implementation for the fabrication of vehicular brake rotors, the powder may include an aluminum alloy and a ceramic particulate. The aluminum alloy may include Si from zero percent up to 6% to 19% by weight, preferably 7 to 18% by weight, more preferably 9 to 12% by weight and Mg from zero up to 0.1% to 15% by weight, preferably 0.2 to 12% by weight, more preferably 0.4 to 1% by weight. The silicon of the alloy provides excellent wettability and/or bonding to most ceramic particles including silicon carbide. Silicon coupled with SiC reduces the formation of aluminum carbide. Aluminum carbide can corrode in the presence of moisture, thereby losing structural integrity. In a preferred vehicular brake rotor, according to various aspects of the present invention, the composition of the layer is 25% to 65% by volume or more preferably 30 to 65% by volume, and more preferably 35 to 50% by volume of single or mixed ceramic particulate.

A layer refers to a result of the bonding of the metal matrix and the substrate. A cross section of a product of a substrate and a layer formed according to various aspects of the present invention may reveal a graded concentration of a component material of the powder beginning at the surface of the product and extending into the substrate. The layer corresponds to the portion of the product having more than or equal to a concentration of the component material that is significant to serving a function of the product. The interior boundary of the layer may be difficult to ascertain by visual inspection. However, based on the intended function, concentration of component material needed to significantly perform that function, and electron dispersive spectrometry, a boundary (e.g., depth from the surface) may be determined. Because the boundary may not be apparent to visual inspection, the boundary may be determined by analysis, simulation, and/or test and specified as a dimension (e.g., thickness) of the product. For example, for a vehicular brake rotor as the product, a layer formed by powder 164 may extend into the product from the surface of the product to a boundary defined with reference to a concentration of ceramic particles associated with an end of useful braking life of the vehicular brake rotor. A concentration of silicon carbide from the powder may be determined by test at various depths of a prototype product so as to define the braking layer. A method for forming a layer onto a surface of a solid substrate, according to various aspects of the present invention, produces the layer substantially absent of porosity as discussed above. This result is obtained, in some implementations, by a combination of one or more of evacuating the die cavity, heating the contents of the die to a temperature between the melting point of the metal powder and the melting point of the substrate, and applying pressure for a period that may begin before any potential exothermic reaction between the powder and the substrate and may end after the layer has cooled below the melting point of the powder. In an implementation of the method to produce a vehicular brake rotor, the layer comprises a ceramic joined to the substrate by integration with the substrate to form a metal matrix composite. The layer may have superior friction, wear, and thermal capacity characteristics compared to the substrate.

An implementation of such a method includes in any practical order, loading contents into a die where the contents include a solid substrate and a powder; heating the contents to a temperature that enables melting of the surface of the substrate and the powder; and densifying the contents. In another implementation heating in the absence of an exothermic reaction is performed that achieves bonding between the surface layer and the substrate. The method may further include evacuating the die before densifying.

Figure 2:
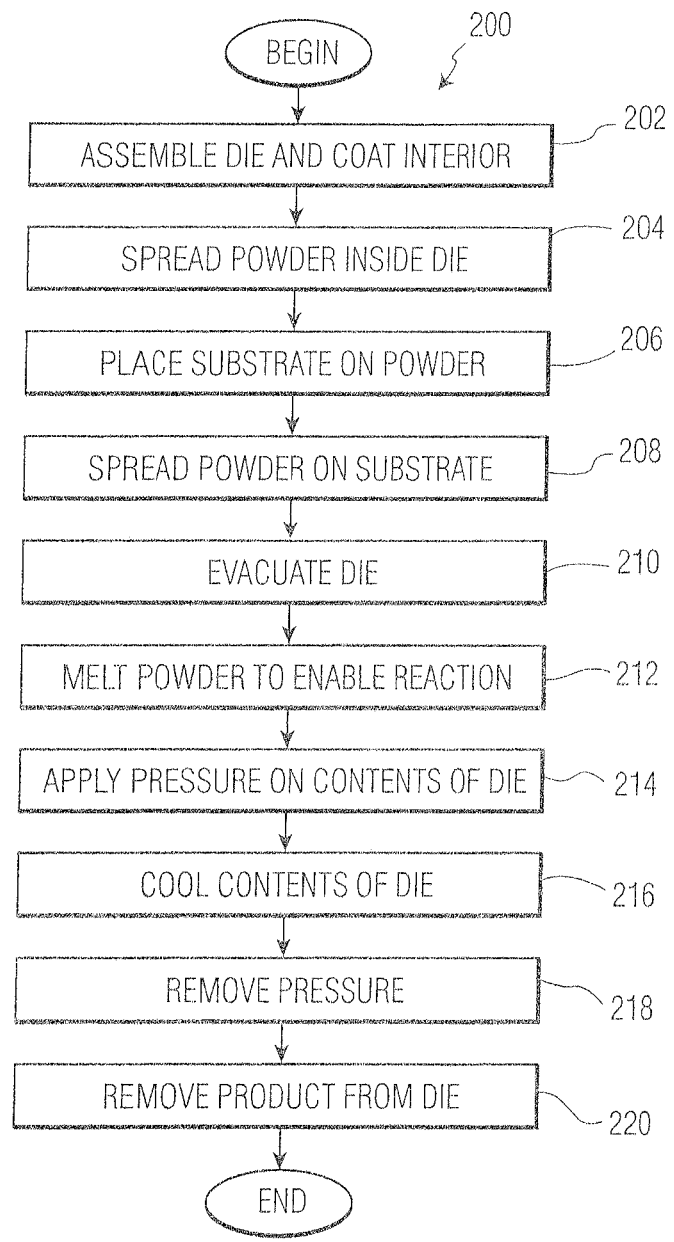
FIG. 2 is a flow chart of a method for forming a layer onto a surface of a substrate, according to one aspect of the present invention.
Figure 5:
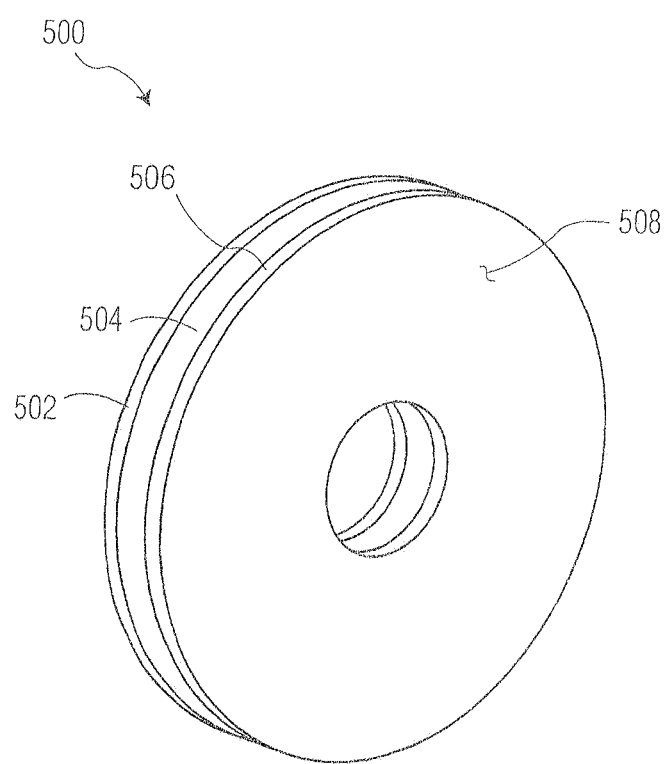
FIG. 5 is a perspective view of a press fit tip and bottom assembled together.

For example, method 200 of FIG. 2, begins with assembling (202) a die (150), coating the interior of the die with a mold release compound, and placing the assembled die within the chamber. Assembly may be omitted (e.g., unnecessary) when a die of unitary construction is used, for instance a die capable of containing the contents (in any phase occurring during the process) and product, as discussed above.

Depending on the materials used for the die, the powder, and the substrate, a suitable release compound may be applied to coat the interior of the die. Such a coating facilitates removal of the product from the die. For example, a dry film lubricant formed of graphite and thermoplastic resin of the type used as a billet lubricant in hot forging of aluminum, orbital forging, and cold extrusion as well as mold pre-treatment in metal casting may be used. For instance, DAG 386 marketed by Acheson may be used. Boron nitride release compounds also may be used.

Loading the die with contents may be accomplished by spreading (204) a powder (164) inside the die (150), placing (206) a substrate (162) (e.g., a brake rotor core) onto the powder (164), and spreading (208) powder (165) to cover the substrate (162). Aluminum ingot in solid form or in powdered form such as A356 or A359 may also be used in place of the mixed metal powders. The two powder distributions or two ingots or both powders and ingots and the substrate constitute the contents of the die.

In another implementation, one of the spreading steps may be omitted for forming a layer on only one side of the substrate.

Prior to loading the die, the powder may be prepared as a uniform mix of two or more powdered materials. Uniformity of particle size distribution as well as uniformity of particle material distribution within the mix may be accomplished by preparing the powder at least in part using conventional pulverizing, screening, and mixing technologies.

After loading, the die (150) may be covered (154) as discussed above. In one implementation, the die (150) is closed leaving a vent (172) of the die open for evacuation of residual atmospheric gases from the interior of the die. The die may be placed in a vacuum hot press, a system (100) as discussed above, or a vacuum chamber for evacuation.

In the case where the die includes a vent and the vent is open, gases in the interior of the die may be removed by evacuation (210) and/or purging in one or more cycles to obtain a suitable absence of atmospheric or other gas that could otherwise contribute to porosity in the layer. Any introduced gas may remain to participate in a desired chemical reaction or, preferably, be evacuated from the die. After evacuation, the vent is closed, for example, by movement of the ram as discussed above. In other implementations, the vent is closed by covering the vent using conventional techniques (e.g., introducing a plug into the vent, applying a band around the die to secure the plug, applying a band around the die to cover the vent).

In one implementation, evacuation (210) is accomplished in a vacuum chamber (as opposed to a vacuum hot press) equipped to close the vent. In another implementation, the die is loaded (204, 206, 208) and closed in an evacuated chamber. In still another implementation, the die does not include a vent and the die is loaded (204, 206, 208) and closed (e.g., cover 154 installed) in an evacuated chamber. The die is then placed in a conventional hot press or a system of the type discussed above with reference to FIG. 1 except that the evacuation subsystem is omitted with consequent simplifications to the controller and chamber).

One or more loaded dies (150) may be prepared in advance, transported, and/or stored indefinitely. Loaded dies may be combined into a web for batch processing. Batch processing may be accomplished with conventional materials handling technologies between any steps of method 200. The contents of the loaded die are heated (212) to an elevated temperature sufficient to melt the metal alloy in the surface layers. Any exothermic reaction between component materials of the powder will further increase temperature in the surface layer so that less external heating is required, producing what is herein called a melt. Generating a higher temperature at the interface between the surface layers and the core will also contribute to better adhesion between the surface layers and the core. However, for certain component materials such as Al—SiC powder, the exothermic reaction will either be very small or not occur at all unless e.g., Ti is added. The heating may be continued until the entire die contents are at the elevated temperature. Heating may be discontinued after a period sufficient to fully melt the surface layers and bond to the core and for substantially completing the exothermic reaction of the contents of the die (e.g., time required for 90% to 100% of the intended reactants to be consumed by the reaction). The exothermic reaction may also involve a surface of the substrate (162) adjacent to the powder. Enablement generally includes exceeding the melting point of a component material of the powder.

In the absence of the substrate, the powder has a melting temperature at which at least one component material of the powder exists in a liquid phase. The powder melting temperature may be defined as a temperature at which one or more component materials of the powder exist in a liquid phase. When more than one component is melted, the melted components may form an alloy or a new compound. For example, molten aluminum alloy may react with titanium powder to form one or all the intermetallics TiAl, $Ti_3Al$, $TiAl_3$. Remaining component materials of the powder (generally, ceramic particulate) may continue in a solid phase. Exothermic reactions may improve the wetting of the solid materials of the powder with the liquid phase materials of the powder.

The surface of the substrate when not in contact with the powder has a melting temperature, herein called the substrate melting temperature. The surface of the substrate may be subject to the heating and chemical effects of the exothermic reaction and experience localized melting at its surface or that in contact with the lower melting temperature surface layer. For example, silicon in aluminum alloys lowers its melting temperature. If Si is present in the surface layer with Al, the Si could begin to react with the surface of the core and diffuse into the core to cause further melting. Thus, the time at the melting temperatures during processing is important and must be optimize to avoid melting the core beyond the surface of the core. Extended times at the melting temperature could also cause porosity at the interface, which is detrimental to mechanical and thermal properties.

In an important class of implementations, according to various aspects of the present invention, the bulk of the substrate does not exist as a liquid at any time during the process. To avoid bulk melting, the elevated temperature discussed above, must be below the substrate melting temperature. To avoid bulk melting, the elevated temperature, duration of maintaining the elevated temperature, extent of any exothermic reaction, and the thermal capacity of the substrate are selected by analysis, simulation, and/or test.

Before, during, and/or after enabling any potential exothermic reaction, the contents of the die may be densified. Densification may be accomplished using techniques somewhat similar to hot press techniques. Hot press techniques apply pressure to solid materials. In contrast, pressure, according to various aspects of the present invention, is applied to a melt that includes liquid. For example, pressure may be applied (214) to the contents before and/or during any exothermic reaction that may occur. The pressure (i.e., a mechanical force) may contribute to initiation and/or maintenance of the exothermic reaction. The pressure may be applied to a component of the die (e.g., cover 154, base 156, both cover and base). The pressure may be applied to force the cover and base of the die toward each other. Pressure may continue at the same force or at a series of forces. Pressure may be interrupted briefly and reinstated, for example, to facilitate movement of the die out of a region for heating (104) and into a region for cooling.

By applying pressure to the melt against the substrate possibly during the exothermic reaction, at least one material of the melt (e.g., a metal matrix composite, an intermetallic composite, a liquid metal alloy, a product of the reaction) bonds with the substrate by forming a metal matrix composite, an intermetallic composite, and/or an alloy of the substrate. By applying pressure to the melt, solid particulate material of the melt may be more thoroughly wetted. Consequently, when the product is in use, the layer may retain the solid particulate in adverse conditions.

The exothermic reaction, presence of the melt against the surface of the substrate, and/or pressure of the melt against the substrate may integrate the melt and the surface of the substrate. Integrating may include local melting of the surface of the substrate.

Preferably, densification continues as the contents of the die cool from a melted liquid component to a solid. For some substrate and powder combinations, significant shrinking of the product may occur during cooling from a liquid to a solid. Porosity may be avoided by continuing densification pressure during cooling. For example, pressure is maintained on the contents of the die while the contents of the die are cooled (216). Accelerated cooling may be accomplished using conventional technologies (e.g., introducing chilled gas into the chamber such as from a supply of liquid nitrogen or merely a gas flow through the chamber).

After a risk of further significant shrinkage is low, pressure may be removed (218). Thereafter, the chamber (102) may be prepared for opening. The die may be removed from the chamber to facilitate removal of the product from the die. Finally, the product is removed (220) from the die. Removal may include disassembly of the die. Removal may include removing a peripheral component from the remaining combination of the die and the product, then separating the base and cover components from the product. The components of the die may be refurbished for reuse or reused as-is.

In one implementation, according to various aspects of the present invention, the product is ready for installation in a next assembly or ready for use. To meet product specifications, post-process machining may be unnecessary. In other implementations, the product is in near-net shape, ready for post-process machining.

In an implementation for forming a vehicular brake rotor, a die serves as a containment vessel for molten metal. All components of the die may be formed of similar constitution to avoid differences in thermal expansion. For example, die 150 of FIG. 3 includes peripheral component 152, bottom base component 156, hub component 158, and top cover component 154 of FIG. 4. In one implementation, the components have the dimensions and characteristics described in Table 1 below.

A peripheral component provides one or more exterior side walls for a die. The exterior side walls may correspond to a net shape desired for the product. Circular and oval shapes are preferred to simplify removal of the product from the die and for better containment of molten metals. For example, peripheral component 152 is formed as an empty cylinder having an axis of circular symmetry through center 302. Peripheral component 152 defines at radius 386 an exterior surface of die 150.

A base component serves to at least partially close a peripheral component so that the die may be loaded. A base component may provide a surface for the application of mechanical force against the contents of the die. For example, base component 156 is formed as a disc having an axis of circular symmetry through center 302 that corresponds to the axis of symmetry of peripheral component 152. Base component 156 forms a circular friction fit seal at radius 384 with peripheral component 152. Base component 156 includes a circular orifice sized to form a friction fit seal against hub component 158 at radius 382. The friction fit seal between components is adjusted such that at operating temperature expansion does not result in relaxing the friction fit that allows liquid metal under pressure to leak through the friction fit.

A hub component provides one or more interior side walls for a die. The interior side walls may correspond to a net shape desired for the product. Circular and oval shapes are preferred to simplify removal of the product from the die. For example, hub component 158 is formed as a cylinder having an axis of circular symmetry through center 302. Hub component 158 forms a circular friction fit seal at radius 382 with base component 156. Hub component 158 includes a vent 172.

Vent 172 may be formed by drilling one or more holes into hub 158. In other implementations, hub component 158 includes more than one vent of similar construction and orientation.

A cover component for a die cooperates with one or more other components of the die to fully contain the contents within the die. A cover may provide a surface for the application of mechanical force against the contents of the die. For example, cover component 154 is formed as a disc having an axis of circular symmetry through center 401 that corresponds to the axis of symmetry of peripheral component 152. Cover component 154 forms a circular friction fit seal at radius 384 with peripheral component 152. Cover component 154 includes a circular orifice 402 sized to form a friction fit seal against hub component 158 at radius 404 and 382.

TABLE 1

| Component | Dimensions (inches) |
| --- | --- |
| Peripheral component 152 | Wall thickness 3.0 |
|  | Height 3.0 |
|  | Outside diameter 18.0 |
| Base component 156 | Thickness 1.0 |
|  | Diameter 12.0 |
|  | Orifice diameter 6.0 |
| Hub component 158 | Diameter 6.0 |
|  | Height 3.0 |

TABLE 1-continued

| Component | Dimensions (inches) |
|---|---|
| Cover component 154 | Thickness 1.0 |
| | Diameter 12.0 |
| | Orifice diameter 6.0 |
| Radius 382 of hub component 158 | 1.5 |
| Radius 384 of base component 156 | 6.0 |
| Radius 386 of peripheral component 152 | 9.0 |
| Radius 404 of orifice in cover component 154 | 3.0 |
| Radius 406 of cover component 154 | 6.0 |
| Vent 172 diameter | 0.0625 inch to 0.25 inch |

Friction fit seals may be formed by mismatching the radii of the components to be friction fit. The mismatch may be from 0.002 inch to 0.010 inch, preferably about 0.003 to 0.009 inch, more preferably 0.004 to 0.008 inch. A mismatch of about 0.005 inch is particularly preferred. The mismatch remains constant at elevated temperatures with section of the same composition and cross-section.

Further features of the invention will be seen from the following working examples.

Example I

As a first example, a vehicular brake rotor may be formed using method 200 as follows. At steps 204 and 208 the powder comprises powdered aluminum silicon alloy, silicon carbide powder, and titanium powder. There is no binder in the powder. The AlSi alloy component material is 59.5% by weight of the type marketed by Valimet as Grade S-9 having a distribution of particle sizes defined by D10 4.82 microns, D50 15.23 microns, and D90 37.56 microns. The SiC component material is 38.0% by weight of the type marketed by ESK as Grade F600-D having particle size from 10 microns to 20 microns. The titanium component material is 2.5% by weight of the type marketed by ADMA having particle size of about 44 microns specified as 325-mesh. The powder is mixed until uniform in material distribution. Each powder portion 164 and 165 is spread to a uniform thickness of 0.010 inch to 0.25 inch, preferably 0.060 to 0.125 inch, more preferably 0.040 to 0.080 inch, most preferably about 0.050 inch.

The titanium component material of the powder serves several purposes. Titanium and aluminum react when the aluminum is in liquid phase, producing heat (i.e., an exothermic reaction). The reaction of titanium and aluminum may form titanium aluminide having a melting point much higher than the elevated temperature of the chamber. Consequently, some of the aluminum of the powder, now as titanium aluminide, is no longer in liquid phase, reducing the risk of leaks through the seals of die 150. The surface of the layer is subject to the formation of piping structures as the melt cools, a result of surface deformation due to shrinking. The formation of piping structures may be inhibited by including the titanium component material in the powder and applying pressure during the cooling of the aluminum alloy component.

At step 206 the substrate is commercially pure aluminum (wrought aluminum) also referred to as 1100 aluminum in the shape of a disc about 12.0 inches in diameter and about 0.5 inch thick. The disc has a central circular aperture about 6.0 inches in diameter for mounting the disc onto a conventional hub of an automobile. The commercial aluminum disc has very low porosity.

At step 210 the die is evacuated using a conventional pump down scenario to a pressure less than 100 torr. The chamber is back filled with nitrogen or argon gas and then pumped down a second time. The chamber is filled with nitrogen or argon gas and then pumped down a third time. The resulting pressure is less than 100 torr. Prior to evacuation, the powder in the die may be dried. To accomplish drying, the heating subsystem 112 is programmed with a set point of between 150 degrees and 250 degrees Celsius, preferably about 200 degrees Celsius and a hold time of up to 10 hours to 20 hours. The vent is closed by programming the pressing subsystem to a set point of from 20 psi to 100 psi to smoothly move the cover from the first position to the second position as discussed above.

In another implementation, the powder is pre-dried by any conventional technique (e.g., vacuum, temperature) before being spread into the die (204, 208). Consequently, step 210 may be simplified by omitting the temperature set point and hold time.

At step 212 the heating system is programmed with a set point of about 625 degrees Celsius and a hold time of about up to 1.5 hours. A set point of 550 degrees Celsius and a hold time of about 2.0 hours may also be used. A set point of 750 degrees Celsius may be used for a period that ends when a temperature of hub component 158 reaches a temperature from 550 degrees to 625 degrees Celsius; followed at the end of the period by a set point of 625 degrees Celsius and a duration of from 1.5 hours to 2.0 hours. As discussed above, the substrate comprises a metal in pure or alloy form having a substrate melting temperature that is higher than a temperature that melts a component material of the powder. The contents of the die are heated in a manner that does not result in bulk melting of the substrate.

Steps 212 and 214 are performed concurrently.

At step 214 pressing subsystem 114 is programmed to a set point of from 250 psi to 600 psi, preferably from 350 psi to 600 psi more preferably 500 psi and a rate to achieve a transition time of from 0.25 to 1.0 hour, preferably about 0.5 to 1.0 hour, more preferably about 0.5 hour. The linear displacement of ram 134 within die 150 is limited to the calculated thickness of the contents when in liquid form. After cooling begins in step 216, an additional linear displacement into die 150 may be calculated to account for shrinking of the product during cooling.

At step 216 the heating system is programmed with a set point of ambient temperature. Cooling proceeds for about 2.5-3 hours without forced cooling at which time the die is about 300 degrees Celsius. Preferably, densification continues through cooling in the evacuated chamber.

In another implementation, after a final soak at 625 degrees Celsius, the evacuating subsystem is programmed with a set point of ambient pressure and further cooling is accelerated by introducing nitrogen into the chamber from a liquid nitrogen source.

At step 218, the pressing subsystem is programmed with a set point of zero psi or the pressure is simply released manually. When the set point is achieved, the die is removed from the chamber.

At step 220 die 150 is disassembled to remove the formed disc, which may then be welded to a rotor hub for installation on a vehicle. The resulting vehicular brake rotor product has a solid aluminum core about 8 mm thick and a layer about 3 mm thick on each side comprising silicon carbide in an aluminum matrix for the braking surface. From 35% to 60% of the braking surface area on each side of the rotor is a silicon carbide metal matrix composite. The porosity of the rotor is preferably less than 0.5-1% by volume. The bond formed between the metal matrix layer and the core is a metallurgical diffusion bond which eliminates delamination and spalling. As a result of the method, evacuation degassed the melt, applied mechanical force maintained the solid silicon carbide particles in the melt, and applied mechanical force contributed to bonding of the melt to the surface of the substrate.

Vehicular brake rotors, formed using the systems and methods discussed herein, may include a ceramic composite through the full thickness of the rotor that may include an exothermic component of the formulation. In other implementations no exothermic component is utilized in the formulations and the ceramic composite portion of the rotor exhibits a gradation of the ceramic particle from a relatively high concentration on the friction surface to a relatively lower concentration through the thickness of the rotor.

Example II

As a second example, a vehicular brake rotor may be formed in a variation of method 200 as follows. At steps 204 and 208, the powder comprises aluminum alloy, titanium, and silicon carbide. The aluminum alloy is of the type generally referred to as 356. Silicon carbide is included at 35% of the powder. Ninety percent of the silicon carbide particles are 15 micrometers (μm). The particles are dry mixed by any conventional mixing technology (e.g., ball mill with steel balls or ceramic balls, attrition milling, rotational tumbling, pulse fluid bed). After mixing to a uniform material consistency, the powder is poured into a die to contain the mixture when heated to above the melting point of the aluminum alloy of the powder.

At step 206, a plate of pure aluminum produced by casting or rolling is used as the substrate and aluminum alloy 356 used as the surface layers.

At step 210, the loaded die is placed in a chamber capable of evacuation of air. A vacuum pump is used to pump down the pressure in the chamber to under 100 Torr. The chamber is back filled with an inert gas (e.g., nitrogen, argon, carbon dioxide, ammonia). The pump down and back filling cycle is repeated two additional times.

Steps 212 and 214 are performed concurrently.

At step 212 the temperature is raised to the melting point of aluminum alloy 356, thereby melting the aluminum alloy of the powder and melting the surface. The titanium powder reacts with the molten aluminum of the powder and the substrate exothermically (a thermite type reaction) producing heat that contributes to the melting of the aluminum alloy of the powder. The heat also enhances the wetting and/or bonding of the aluminum with silicon carbide particles and the wetting and/or bonding of silicon with the silicon carbide particles. The titanium component material of the powder reacts with the molten aluminum alloy of the powder to form titanium aluminides (e.g., TiAl, Ti3Al and TiAl3). Some of the titanium component material of the powder may react with silicon from the aluminum alloy of the powder to form titanium silicides (e.g., TiSi2, Ti5Si3).

At step 214, pressure is applied to the die with a leak proof fitted ram that prevents any squeeze out of liquid aluminum metal. Pressures from approximately 1.4 MPa to 35 MPa (200 psi-5 ksi) may be used. The selected pressure is sufficient to cause the liquid aluminum alloy of the powder to infiltrate the remaining component material of the powder. The pressure of the ram on the molten aluminum alloy presses onto the silicon carbide particles. In a first implementation, sufficient pressure and duration (e.g., suitable set points) concentrate the silicon carbide particles at the surface adjacent to base 156 to provide relatively higher friction on that surface as compared to the surface adjacent to cover 154. In a second implementation, a lower pressure set point and/or shorter duration set point is used compared to the first implementation. In the second implementation, silicon carbide particles are more uniform throughout the cross-section of the product.

At step 216, heating is discontinued. Cooling proceeds to ambient temperature.

At step 220 the product, a vehicular brake rotor, is removed from the die. The product preferably exhibits substantially no porosity. No subsequent machining is required for use of the product in a vehicular brake system.

The product consists of a composite formed in part by an exothermic reaction of titanium particles and molten aluminum alloy, where the composite is a result of heat from the reaction, auxiliary heating, and pressure pushing ceramic particulate through molten aluminum.

In a first implementation, steps 210 continues concurrently with steps 212, 214 and 216. In a second implementation steps 212, 214, and 216 are performed in ambient atmospheric pressure. Although both products contain substantially low porosity, lower porosity can result from the first implementations, compared with the second.

Several variations of this second example are implementations according to various aspects of the present invention. Any aluminum alloy may be used for the powder and the substrate as long as the melting temperature of the substrate is higher than the aluminum alloy used for forming the layers. The amount of SiC powder spread in the die at steps 204 and 208 may be increased to increase the surface concentration or loading of ceramic in the product. Pressing may be performed under reduced atmospheric pressure, or at ambient atmospheric pressure of an inert non-reactive gas. Heating may be accomplished using conventional electrical conduction, magnetic induction, radiant microwave technologies or resistant heating of the die contents through an upper and lower ram. The powder may include reactants in place of or in addition to titanium to support exothermic reactions with aluminum involving cobalt, iron, magnesium, and/or nickel. The powder may include ceramic particles of size suitable for the product function. For vehicular brake rotors, ceramic particles may be used having size less than 500 microns, preferably less than 100 microns and most preferably 50 microns and below. Any ceramic particle may be used in place of or in addition to silicon carbide. In other implementations, ceramic particles are a mix of different conventional materials (e.g., oxides, carbon, titanium carbide, chromium nitride, chromium carbide, titanium diboride).

Example III

As a third example, the process of Example II was repeated, except the substrate was formed of aluminum alloy 5052, and the metal alloy powder used in the surface layers was type 4032.

Example IV

As a fourth example, a vehicular brake rotor may be formed by a method 200 as follows. At steps 204 and 208, a mixture of aluminum powder and silicon carbide powder is used.

At step 206, the substrate is a disc of commercially pure titanium, pre-cut to dimensions for a vehicular brake rotor.

Steps 212 and 214 are performed concurrently.

At step 212, resistance heating includes connecting an electric current source (e.g., DC, AC, pulse) supply to the ram and the base component of the die. Electrical current through the die raises the temperature, melts the aluminum powder, and generates the plasma. Heat causes the aluminum to melt. The bulk substrate does not melt because the temperature experienced by the substrate does not exceed the melting temperature of the substrate. However, the surfaces of the substrate will start to react with the elements in the metal matrix composite surface layers, which is beneficial as it promotes strong bonding at the interface. The melted aluminum exothermically reacts with the titanium of the substrate to form gamma titanium (i.e., TiAl) or other aluminides of $Ti_3Al$ or $TiAl_3$. During the liquid phase of the aluminum, a fully dense surface layer forms, consisting of silicon carbide particles in titanium aluminide (e.g., TiAl, Ti3Al, TiAl3).

At step 214, pressure is applied in the range of approximately 10 MPa to 35 MPa (1.45 ksi-5 ksi) to densify the contents of the die. With pressure applied, the silicon carbide particulate reinforced titanium aluminide is made nearly fully dense, substantially free of porosity.

Several variations of this third example are implementations according to various aspects of the present invention. The powder may further include other alloying elements known to produce good gamma alloys (e.g., chromium, manganese, niobium, silicon). The feed powder may be prealloyed powders such as TiAl, Ti—Al—Cr—Nb, etc. in contrast to the initial feed to Ti and Al powders with the SiC or other ceramic particles such as TiC, $TiB_2$, $B_4C$, etc. The substrate may be formed of another alloy of titanium instead of the commercially pure titanium such as alloy Ti-6AL-4V Heating can be supplemented by radiation (e.g., microwave), magnetic induction, or other technologies as discussed above. The resistance heating technology between the rams may be replaced with one or more of the heating technologies discussed above. Any ceramic particle or combination of ceramic particles may be used in the powder. The powder mixture may be free of exothermic reaction components or may include other reactants for exothermic reaction(s) such as intermetallic formers (e.g., copper, cobalt, iron, nickel).

Example V

As a fifth example, a vehicular brake rotor may be formed by method 200 as follows. Steps 204 through 220 are the same as for the third example, discussed above with a few exceptions. At step 210 the die is not evacuated. Instead the die and the atmosphere of the chamber are filled with an ionizing gas (e.g., argon, helium, nitrogen).

At step 212 resistive heating is applied for a duration until (and including) the time the aluminum material component of the powder reaches its melting temperature. This duration may be determined by analysis, simulation, and/or test to account for the mass and heat transfer characteristics of the die and contents of the die, and any effects of the other system components (e.g., the ram). Concurrent with the resistant heating melting the aluminum component a plasma is generated through the melt due to the voltage which may be pulsed as required to melt the aluminum. The plasma relatively quickly raises the temperature of the disc and the melt, facilitating densification. The plasma cleans the surfaces of the particles of the aluminum before melting and the un-melted, silicon carbide ceramic, facilitating consolidation and densification.

The plasma may be generated by conducting a high energy discharge of electricity from additional power supplies and/or a capacitor bank through the ram that ionizes the gas in the die.

In one implementation, resistive heat is omitted from step 212 and melting is accomplished solely by heat associated with the plasma.

Several variations of this fourth example are implementations according to various aspects of the present invention. The substrate may be any structural metal or alloy of structural metal as discussed above. Any ceramic particle or combination of ceramic particles may be used in the powder. The powder may include other reactants for exothermic reaction(s) such as intermetallic formers (e.g., copper, cobalt, iron, nickel). The pressure of the ionizing gas within the die may be below ambient, ambient, or greater than ambient pressure.

Example VI

A mixture of aluminum alloy 356 in powder form was mixed with powders of titanium that was 2% of the sum of the aluminum and 35% SiC with the latter in a particle size with 90% at 15 micrometers (μm). The particles were dry mixed by suitable mixing including ball mill with steel balls or ceramic balls, attrition milling, rotational tumbling, pulse fluid bed and poured into a die to contain the mixture when heated to above the melting point of the aluminum. On top of the dry mix a solid plate of 356 aluminum alloy was placed. The loaded die was placed in a chamber that was capable of evacuation of air. A vacuum pump was utilized to reduce the pressure in the chamber to under 100 Torr. The chamber was back filled with an inert gas which included nitrogen, argon, $CO_2$ and ammonia, and repumped down three times. Pressure was applied to the die with a fitted ram and the temperature raised to the melting point of the 356 aluminum alloy. Pressures from approximately 10 MPa to 35 MPa (1.45 ksi-5 ksi) are satisfactory to infiltrate the molten 356 alloy through the dry powder mixture wherein the titanium powder reacts with the molten aluminum exothermically (a thermite type reaction) producing internal heat that contributes to the melting of the 356 alloy powder and enhancing the wetting/bonding of the aluminum and silicon with the SiC particles as well as the titanium reacting with the molten alloy that forms titanium aluminides that can include TiAl, $Ti_3Al$ and $TiAl_3$, and the suicides $TiSi_2$ and $Ti_5Si_3$ from the Si in the 356 alloy. The pressure of the ram on the molten 356 alloy presses onto the SiC particles that if high enough pressure and held long enough will concentrate the SiC particles on the bottom surface that can subsequently provide higher friction on that surface. If this pressure is in the lower range and the pressure removed after sufficient time for the molten top 356 layer to infiltrate the SiC particle bed, the SiC will be uniform through the cross-section of the formed composite. Heat power is turned off and the molten 356 alloy cooled to room temperature and the rotor removed from the die. Typically the surface of the melt molded rotor is sufficient and the molding to tolerance that no subsequent machining is required for mounting the rotor in the brake system.

The exothermic heating between the titanium particles and the molten aluminum coupled with the auxiliary heating and the ram pressure pushing the molten aluminum that is melted on top through the composite results in a composite with a residual porosity less than 2% and most often less than 1%, and typically less than 0.5% which is an ideal composite for brake rotors.

One iteration that enhances the probability of low porosity is to perform the pressing under reduced pressure. Removing any residual gas by reducing the pressure contributes to no residual gas pockets being trapped leading to residual porosity.

Any aluminum alloy can be used as the matrix, any volume loading of SiC or any ceramic particle composition can be used, and the pressing operation can be performed under reduced pressure or at ambient pressure of an inert non-reactive gas. The heating method can be by conduction, induction, microwave or any suitable means to raise the mixture in the die containment to above the melting point of the aluminum. Also, reactions other than the titanium and aluminum can be used to generate an exothermic heat generating reaction. Some example exothermic reactions with the molten aluminum include Fe, Ni, Co, and Mg. The particle size of the ceramic filler can be any size, but smaller size particles perform best in braking operations, therefore particle sizes under approximately 500 μm should be used and preferably under 100 μm and most preferably under 50 μm. Also, mixtures of ceramic particles can be used to achieve custom properties as the friction surface of the composite rotor. For example, oxide particles aid in resisting heat flow into the body of the rotor in emergency braking scenarios, carbon can also react with the titanium to form a TiC particle, chromium nitride or carbide are known reducers for friction while $TiB_2$ increases thermal conductivity. It is therefore possible to customize the alloy and particle compositions to produce brake rotors with customized properties that includes friction coefficient and thermal conductivity of the surface.

Example VII

Figure 6:
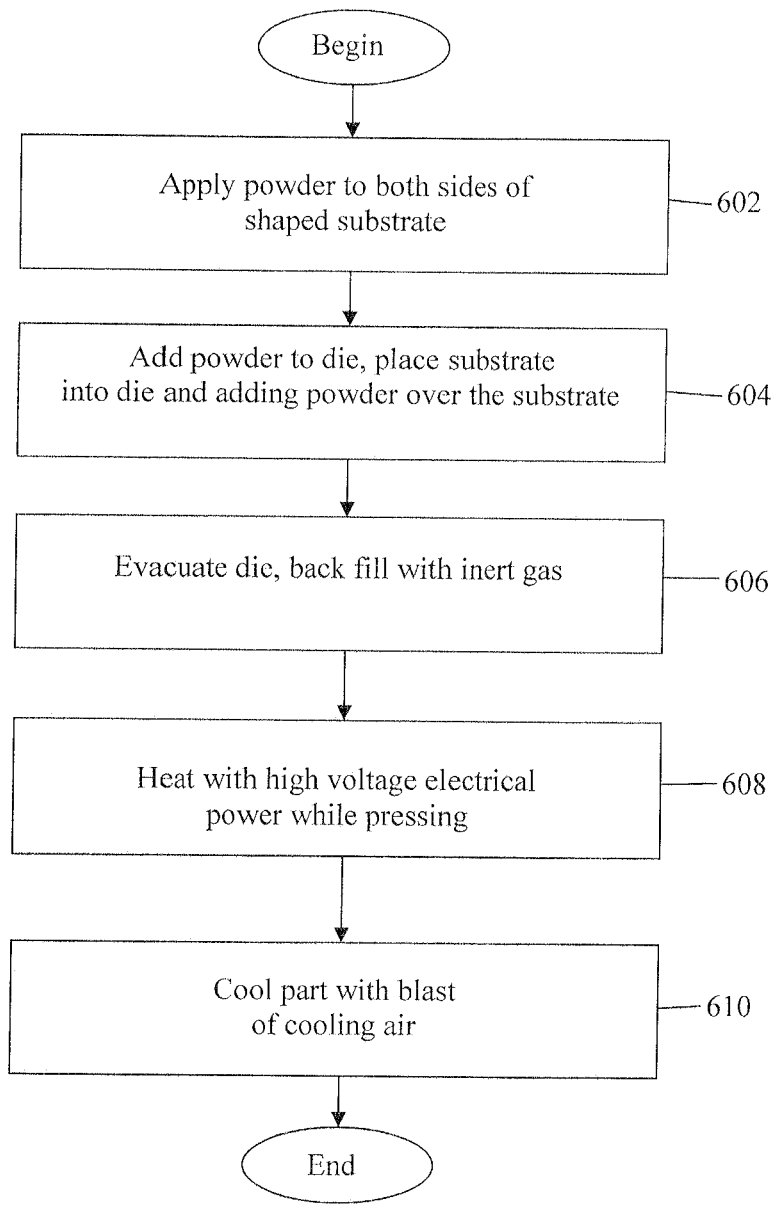
FIG. 6 is a view similar to FIG. 2 of an alternative method for forming a layer onto a surface of a substrate according to another aspect of the present invention.

Referring to FIG. 6, a disc of CP titanium precut to brake rotor dimensions was produced, and a mixture of aluminum and SiC powder as previously described was applied to both sides at step 602. Additional mixture was placed in the bottom of a die, the CP Ti disc placed in the die, and a layer of the mixture was added to the top surface of the CP Ti disc in the die at step 604. A ram was added to fit the die, in a chamber, and the chamber was evacuated and back filled with inert gas at step 606. Heating was performed at step 608, while pressing, by connecting a high amperage, e.g., 25,000 amp, alternating electrical current power supply to the top ram and the bottom of the die which may also be a fitted ram. The electrical power applied raised the temperature on the surfaces of the CP Ti disc that melted the aluminum in the powder mix. Heating was continued to cause the aluminum to exothermically react with the titanium while pressure was continued to be applied in the range of approximately 10 MPa to 35 MPa (1.45 ksi-5 ksi). During the liquid phase of the aluminum, a fully dense surface layer consisting of SiC particle in titanium aluminide that can include TiAl, $Ti_3Al$ or $TiAl_3$ which the TiAl is referred to as gamma titanium was formed. Other alloying elements known to produce good gamma alloys such as Nb, Cr, Mn, Si, etc. can be added to the Al—SiC powder mix. The melting of the aluminum reacts with the CP Ti disc to form a metallurgical bonded surface layer to the CP Ti disc. With the applied pressure the SiC particulate reinforced titanium aluminide is fully dense and free of porosity, a highly desirable feature for brake rotors. The entire heating process was quite rapid, taking only about 60 seconds. The electrical current power supply was disconnected, and the die assembly containing the coated brake rotors was blasted with cooling inert gas or air, depending on temperature, for about 5 minutes at step 610.

The substrate can be CP Ti disc or any titanium alloy and heating can be performed by pulsed or continuous electrical current, microwave, induction, radiation, etc. as an alternate to the resistant heating between the rams. Also any ceramic particle or combination of ceramic particles can be utilized and that other exothermic heating reactions which can be intermetallic formers other than aluminum can be used such as Cu, Fe, Ni, Co. It is also recognized that the resistant heating can be accomplished with any frequency current, direct current as well as pulsing the current.

Example VIII

The same set-up as Example VII was utilized. When the resistive heating had brought the aluminum to its melting point, a high discharge of power from additional power supplies or capacitor bank was induced and with a residual atmosphere of argon or helium a plasma becomes generated that instantaneously raised the temperature of the disc and the surface coating. With pressure applied the aluminum reacted with the titanium surface that produced a fully dense pore free surface conversion layer. This process is often referred to as spark plasma sintering (SPS). The plasma generated cleans the particle surfaces and enhances consolidation that is well known in the art. If sufficient pulse of power is initially added, no prior resistant or other form of heating is required that shortens the overall consolidation time to produce the fully dense pore free surface/coating composite with the SiC.

The titanium can be any alloy, the ceramic particles can be singular or mixed to produce a custom surface property and that heat generating reactions including intermetallics other than aluminum such as Cu, Fe, Ni, Co can be used and the ionizing gas can be other than argon or helium to produce the plasma, and the process can be carried out at reduced pressure, ambient pressure or even positive pressure.

Example IX

As yet another example, a vehicular brake rotor is formed using an integrated one piece hub-disc. The cost of the brake discs becomes enabling to their use in automobiles. After a composite disc is fabricated as a sandwich of a composite layer on each side of a monolithic core or as a composite through the entire thickness of the disc, a hub must be welded to the disc that permits mounting to the wheel assembly. The separate making of the hub and its welding to the disc which may require a subsequent machining operation for any loss in parallelism due to the welding operation are all costly procedures. An alternative process that reduces cost is to utilize a casting, forging, or alternative process that results in a disc and hub produced in one piece which is then coated with a layer of composite on the disc portion of the assembly. The integrated hub-disc one piece is placed in a die set such as graphite that contains an outer ring with a solid graphite disc for the base. A mixture of aluminum-silicon carbide (Al—SiC) powder is placed in the bottom of the die, on top of the solid graphite disc piece with an additional graphite plug for the hole on the bottom of the hub-disc opposite the side with the protruding hub. After the one piece hub-disc is placed in the die, an additional mixture of Al—SiC is placed on the disc portion of the one piece hub-disc followed by a die top consisting of a hole to cover the hub. The loaded die is placed in a chamber which is closed to the atmosphere. The residual atmosphere is exchanged via purging with an inert gas such as argon or nitrogen, or evacuated by applying a vacuum. The die is heated to a temperature that the Al alloy metal matrix composition melts but the one piece hub-disc does not melt. Pressure is applied in the range of (1 to 8 MPa) to the die that consolidates the Al—SiC alloy and metallurgically bonds to the core one piece hub-disc. Pressure remains applied throughout the cooling cycle that produces a layer of Al—SiC alloy with a porosity of less than 2%. The percent of SiC in the composite layer can be varied from approximately 25% to 65% and preferably 35% to 50%.

Example X

As another example, the process of example XI was repeated, except the formed brake disc was subjected to heat treatment to increase hardness and improve its mechanical properties. Preferably the heat treatment comprises a so-called T6 temper also known as solution heat treating plus aging in which the sandwich composite is first allowed to cool naturally. The sandwich composite is then heated to a temperature of 510° C. in a high temperature oven. After 4 hours, the casting is removed from the oven and quickly quenched. The casting is then moved to a low temperature oven and held at 170° C. for 12 hours and then air cooled Example XI An additive manufacturing (AM) process can be utilized following the teachings, for example of our prior U.S. Pat. No. 8,203,095, the contents of which are incorporated herein by reference, to form a composite that is the full thickness of a rotor or as a surface reaction or cladding. Additive manufacturing consists of a CAD driven power beam source that melts powder or wire in a continuously moving spot that builds material layer-by-layer or transforms a surface that can build-up a clad or coating layer. The processing to produce a power beam include electron beam (e-beam), laser or plasma transferred arc (PTA) wherein the work piece is one electrode and a torch head is the other electrode that ionizes a gas such as argon or helium that forms the plasma beam between the head and the part. A brake rotor can be built with any of the power beam processes by co-feeding the metal and ceramic particle to build layer-by-layer. For example, aluminum wire or powder can be fed to the melt pool spot with a ceramic powder also co-fed to produce the composite. The CAD program can be set to build an entire rotor in the thickness desired at virtually any ceramic particle volume desired that includes that most desirable for brake rotors of 35-60%. The ceramic can be varied in concentration at the start of the build and decreased until the final layer thickness is built and again added at a high concentration to provide high wear resistance on each surface of the rotor.

Any power beam process can be used to build the brake rotor layer-by-layer in any desired ceramic particle loading including graduations to each surface in aluminum or its alloys, titanium or its alloys, or other structural metals that can be used as rotors such as Cu, Fe, Ni, Co, Zn.

In a specific case pure 1100 aluminum alloy powder can be used as the matrix and SiC particles as the ceramic filler. The PTA system can be utilized as the power beam source. A feed mixture of 1100 aluminum powder and SiC powder can be used to produce a composite composition of 40 volume % SiC in the aluminum matrix. The PTA system can be set for a build rate of 5 lbs/hr to build the entire rotor in one hour since a typical rotor of the approximate size of 310 mm diameter with a 150 mm open center hole weighs less than 5 pounds in an aluminum-SiC composite.

Example XII

The PTA AM system can be utilized to apply an aluminum-SiC composition to the surface of a CP Ti disc precut to size. The CAD system and power to the PTA can be set to just melt a few mm of the surface of the disc with a powder feed mixture of 356 aluminum alloy and SiC powder to produce a layer of titanium aluminide containing 50 volume % SiC. The PTA beam power can be controlled to compensate for the exothermic reaction of the aluminum with the titanium so as not to melt too deep a layer of the CP Ti disc.

This power beam processing can form the surface clad layer in base materials other than titanium. Base materials that include aluminum and cast iron or steels can be used. If aluminum were the base rotor material, titanium powder can be used to produce the exotherm to form the composite clad layer. Standard cast iron rotors can be used to form surface layers of FeAl, $Fe_3Al$ or $FeAl_3$ as well as titanium to form the titanium intermetallic $TiFe_2$ or TiFe.

Any power beam process can be used to melt the surface of the titanium disc that could be any titanium alloy. Intermetallics other than aluminum such as Cu, Fe, Ni, Co, Zn could be used to form the clad reactive layer surface along with any single or mixed composition ceramic particle as well as base alloys of cast iron or steels onto which the intermetallic-ceramic particle alloy may be formed.

Example XIII

A friction stir welding system can be modified to provide a powder feed into the rotating head that is controlled with a CAD system that provides controlled downward pressure on the rotating head as well as controlled speed forward in a tool path. A mixture of 50 volume % SiC powder and aluminum powder can be fed to the rotating head that has sufficient downward pressure that the friction causes the surface of the titanium substrate to melt with the aluminum in the feed, generating exothermic heat contributing to the melting under the friction stir process rotating head that encapsulates the SiC particles in the molten layer that on solidification as the rotating head moves forward in its CAD guided tool path, a surface of titanium aluminide containing SiC particulate is produced free of porosity.

To speed the forward movement of the rotating head with controlled downward pressure, in front of the head, additional heat can be applied such as a flame torch, laser beam, electron beam, plasma transferred arc (PTA) beam, induction coupling, or a focused radiation beam such as from a tungsten-quartz lamp. The rotational speed and downward pressures rotating head can be somewhat relieved to generate a molten path on the titanium rotor with the additional heat applied in front of the FSP processing. With the CAD control of the FSP the composite layer formed can be over the entire surface of a CP Ti disc precut to size for a brake rotor, or just in a path that is the width of the brake pad.

The thickness of the titanium aluminide-SiC layer can be controlled by the depth of the melt generated by the rotating head speed and its downward pressure, the exotherm from the Al—Ti generated heat as well as any auxiliary heat supplied in front of the forward moving rotating head. Surface layer thickness can be as little as approximately 0.25 mm up to approximately 5 mm. It is possible with a very hard and strong rotating head with sufficient downward pressure and rotating speed to melt depths of 10 or more mm. Such a friction stir capability permits the entire cross-section of a brake rotor to be produced as a composite by friction stir processing (FSP) which is possible in a single pass or multiple passes analogous to layer-by-layer as delineated in additive manufacturing.

While this example is given for a CP Ti base rotor, other base metals such as aluminum, cast iron, steels, copper, and zinc can be utilized to produce a composite with single or mixed ceramic particles by friction stir processing (FSP).

The foregoing description discusses implementations and preferred embodiments of the present invention, which may be changed or modified without departing from the scope of the present invention as defined in the claims. The examples listed in parentheses may be alternative or combined in any manner. The invention includes any practical combination of the structures and methods disclosed. As used in the specification, the words 'process' and 'method' are synonymous. As used in the specification and claims, the words 'having' and 'including' in all grammatical variants are open-ended and synonymous with 'comprising' and its grammatical variants. While for the sake of clarity of description several specific implementations and embodiments of the invention have been described, the scope of the invention is intended to be measured by the claims as set forth below.

What is claimed is:

1. A method for forming a vehicular brake rotor comprising loading a shaped metal substrate and a mixture of metal alloying components and ceramic particles in a die;

heating the loaded contents of the die while applying pressure to melt at least one of the metal components of the alloying mixture whereby to densify the contents of the die and cause at least one melted metal alloying component to infiltrate a surface of the metallic substrate to form a ceramic particle-containing alloy coating in direct contact with the surface of the metallic substrate; and cooling the resulting coated product, whereupon the ceramic particle-containing alloy coating is directly bonded to the surface of the metallic substrate without any intervening layer, and optionally heat treating the coated product.

2. The method of claim 1, wherein the metallic substrate is formed of aluminum, titanium or iron, and alloys thereof, and the coating material comprises a mixture of aluminum or aluminum alloys and silicon carbide, titanium, aluminum and alloys thereof and a ceramic particulate, or titanium or titanium alloys and a ceramic particulate.

3. The method of claim 1, wherein the substrate comprises a hub-disc assembly.

4. The method of claim 1, wherein the loaded contents of the die are electrically heated.

5. The method of claim 4, wherein the loaded contents of the die are heated by inductive heating.

6. The method of claim 4, wherein the loaded contents of the die are heated by conductive heating.

7. The method of claim 4, wherein the loaded contents of the die are heated by direct contact electrical resistance heating.

8. The method of claim 4, wherein the loaded contents of the die are heated by high current pulse discharge by direct contact through the die.

9. The method of claim 4, wherein the loaded contents of the die are flash heated through contactless flash plasma energy dissipation.

10. The method of claim 1, wherein the melting point temperature of the surface of the substrate is changed by contact with the metal-containing mixture.

11. The method of claim 1, wherein the die is heated in the absence of air or at reduced pressure.

12. The method of claim 1, wherein the coating extends into the metallic substrate.

* * * * *